United States Patent [19]
Lupton et al.

[11] Patent Number: 5,543,052
[45] Date of Patent: Aug. 6, 1996

[54] PROCESS FOR REMOVAL OF ORGANIC POLLUTANTS FROM WASTE WATER

[75] Inventors: Francis S. Lupton, Evanston; William G. Sheridan, Glen Ellyn; Marion R. Surgi, Evanston, all of Ill.

[73] Assignee: AlliedSignal Inc., Morris Township, Morris County, N.J.

[21] Appl. No.: 401,322

[22] Filed: Mar. 9, 1995

Related U.S. Application Data

[63] Continuation of Ser. No. 144,158, Oct. 26, 1993, abandoned, which is a continuation of Ser. No. 741,857, Aug. 19, 1991, abandoned, which is a continuation-in-part of Ser. No. 335,610, Apr. 10, 1989, Pat. No. 4,983,299, which is a continuation-in-part of Ser. No. 225,610, Jul. 28, 1988, Pat. No. 4,888,752.

[51] Int. Cl.$^6$ .................................................. C02F 3/10
[52] U.S. Cl. ........................... 210/616; 210/150; 210/909
[58] Field of Search ..................................... 210/615–618, 210/620, 631, 150, 151, 908, 909

[56] References Cited

U.S. PATENT DOCUMENTS

| | | | |
|---|---|---|---|
| 3,617,531 | 11/1971 | Schlicht et al. | 208/263 |
| 3,812,031 | 5/1974 | McCoy et al. | 210/30 |
| 3,904,518 | 9/1975 | Hutton et al. | 210/11 |
| 3,933,629 | 1/1976 | Smith | 210/17 |
| 4,069,148 | 1/1978 | Hutten et al. | 210/11 |
| 4,165,281 | 8/1979 | Kuriyama et al. | 210/17 |
| 4,415,454 | 11/1983 | Fuchs | 210/616 |
| 4,461,708 | 7/1984 | Hakulinen et al. | 210/605 |
| 4,469,600 | 9/1984 | Frydman et al. | 210/610 |
| 4,479,876 | 10/1984 | Fuchs | 210/616 |
| 4,561,974 | 12/1985 | Bernard et al. | 210/151 |
| 4,566,971 | 1/1986 | Reimann et al. | 210/616 |
| 4,576,718 | 3/1986 | Reischl et al. | 210/617 |
| 4,634,672 | 1/1987 | Baumgarten et al. | 435/182 |
| 4,681,851 | 7/1987 | Baumgarten et al. | 435/262 |
| 4,681,852 | 7/1987 | Tribe | 435/108 |
| 4,820,415 | 4/1989 | Reischl | 210/616 |
| 4,983,299 | 1/1991 | Lupton et al. | 210/617 |
| 5,037,551 | 8/1991 | Barkley et al. | 210/603 |

FOREIGN PATENT DOCUMENTS

| | | |
|---|---|---|
| 0092159A2 | 4/1982 | European Pat. Off. . |
| 0150747A3 | 1/1984 | European Pat. Off. . |
| WO86/04923 | 8/1986 | WIPO . |
| WO90/11970 | 10/1990 | WIPO . |

OTHER PUBLICATIONS

Givens et al., "Evaluation of Carbon Impregnated Polyurethane Foam Media, Etc.", 42nd Purdue University Industrial Waste Conference Proceedings, pp. 93–102 (1987).

Bhowmick, A. K., *Handbook of Elastomers*, Marcel Dekker, N.Y. pp. 379–381 1988.

Fox, P., M. T. Suidan, J. T. Pfeffer, Journal Water Pollut. Control, 60, pp. 86–92, 1988.

Givens & Sack, 42nd Purdue Univ. Ind. Waste Conf. Proceedings, pp. 93–102, 1987.

Alsop, G. Michael and Richard A. Conroy, "Improved Thermal Sludge Conditioning by Treatment with Acids and Bases," *Journal WPCF*, vol. 54, No. 2, 1982.

Calcutt, T. and R. Frost, "Sludge Processing—Chances for Tomorrow," *Journal of the Institute of Water Pollution Control*, vol. 86, No. 2, 1987.

(List continued on next page.)

*Primary Examiner*—Thomas Wyse
*Attorney, Agent, or Firm*—Richard C. Stewart, II; Mary Jo Boldingh; Harold N. Wells

[57] ABSTRACT

Tis invention relates to a process for reducing the concentration of an organic pollutant such as phenol in an aqueous stream which comprises passing the stream through a bioreacter containing a plurality of biologically active particles comprising a hydrophobic polyurethane substrate having an effective amount of one or more aerobic microorganism capable of metabolizing at least one of said organic materials on; in or on and in said substrate in the absence or in the substantial absence of a carbon absorbent.

23 Claims, 9 Drawing Sheets

OTHER PUBLICATIONS

United States Building Corporation, P.O. Box 49704, Los Angeles, CA 90049 "The Municipal Waste Landfill Crisis and a Response of New Technology", Nov. 22, 1988 pp. 6–18.

Thomas, J. M., M. D. Lee, M. J. Scott and C. H. Ward, "Microbial Ecology of the Subsurface at an Abandoned Creosote Waste Site," *Journal of Industrial Microbiology*, vol. 4, pp. 109–120, 1989.

Heidman, J. et al., J. of Environ. Eng., 114, pp. 1077–1096 (1988).

Anselmo et al. *Biotechnology B. L.,* 7, pp. 889–894 (1985).

Ehrhardt, H. M. & H. J. Rehm, *Appl. Microbiol. Biotechnol.,* 21, pp. 32–36, 1985.

Morsen, A. & H. J. Rehm, *Appl. Microbiol. Biotechnol.,* 26, 283–288, 1987.

Wang, Y. T., et al. *Journal Water Pollut. Control Fed.,* 58, pp. 227–233, 1986.

Bettmann H. and H. J. Rehm, *App. Microbiol. Biotechnol,* 22, pp. 389–393, 1985.

FIG. 9 Adsorption Curves for Foams and Carbon Impregnated Foams

Adsorption Curves for Hydrophilic Foam & Carbon Impregnated Foam

Adsorption Curves for Hydrophobic Foam and Carbon Impregnated Foam

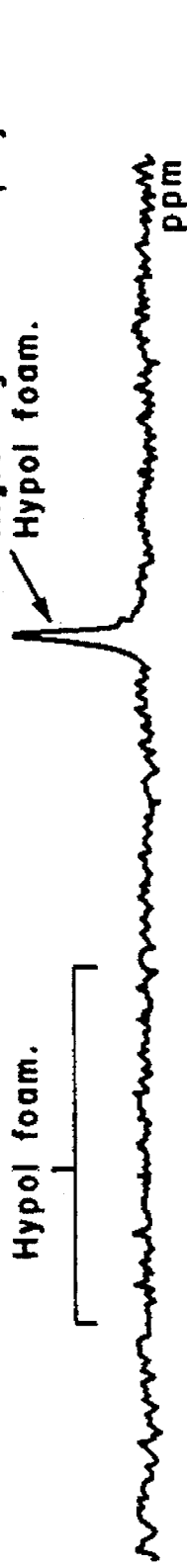
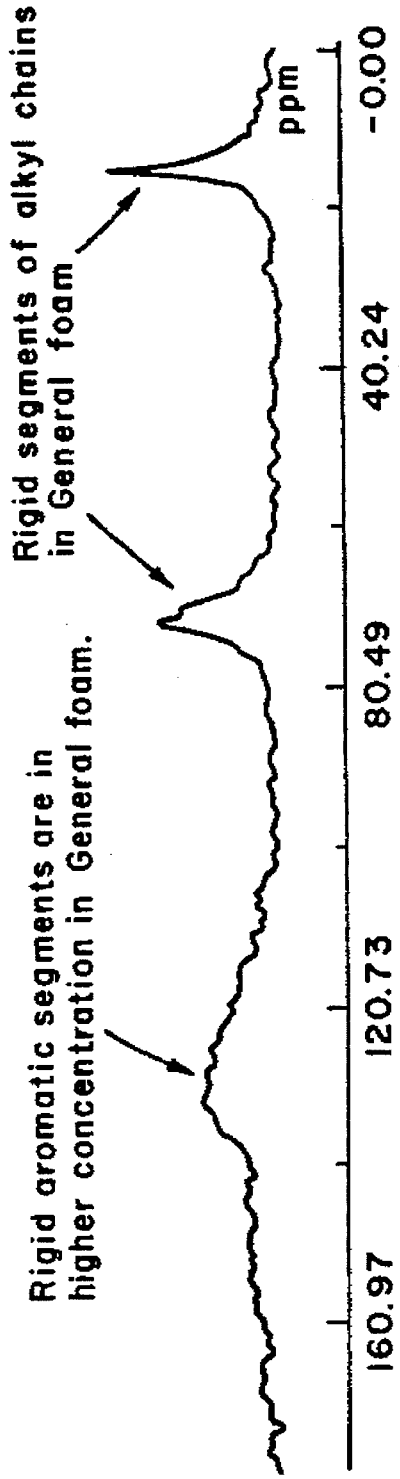

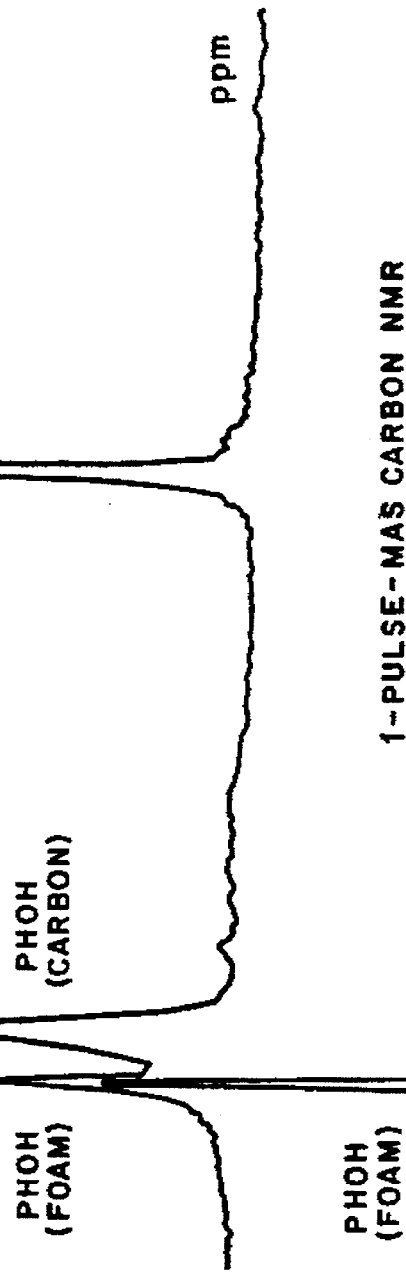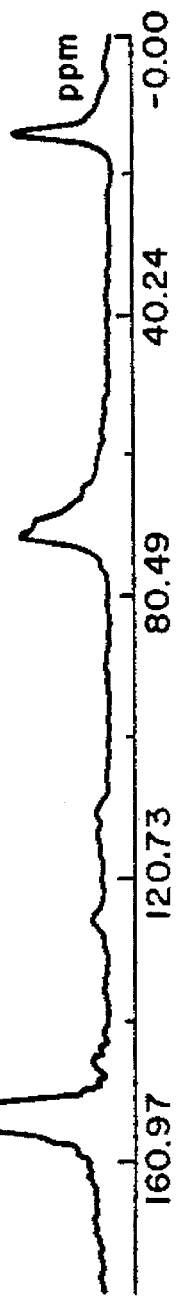
FIG. 14 PHENOL ADSORPTION ON CARBON/HYPOL AND CARBON/GENERAL FOAM.

PROCESS FOR REMOVAL OF ORGANIC POLLUTANTS FROM WASTE WATER

RELATED APPLICATIONS

This application is a continuation of application Ser. No. 08/144,158 filed Oct. 26, 1993, now abandoned, which is a continuation of application Ser. No. 07/741,857 filed Aug. 7, 1991, now abandoned, which is a continuation-in-part application of U.S. patent application Ser. No. 335,610, filed Apr. 10, 1989, U.S. Pat. No. 4,893,299 which, in turn, is a continuation-in-part application of U.S. patent application Ser. No. 225,610 filed Jul. 28, 1988, U.S. Pat. No. 4,888,752.

BACKGROUND OF THE INVENTION

1. Field of the Invention

This invention relates to a process for the removal of organic pollutants from waste water. More particularly, this invention relates to a process for removal of such pollutants especially substituted and unsubstituted phenols by aerobic biodegration using a porous biomass support system in a fixed bed reactor.

2. Prior Art

One of the hallmarks of contemporary civilization is that each increment of technological progress almost invariably is accompanied by a similar increment of environmental regress. As the pace of technological advances quickens, so does the march of environmental deterioration. The realization of environmental damage has occurred only relatively recently, so that present society sometimes finds itself burdened with the accumulated sins of the not-too-distant past. But another hallmark of current society is its acceptance of the undesirability of environmental degradation coupled with a determination to minimize and even reverse it wherever possible. Although the return of ground waters to their pristine condition of an earlier era is not a realistic goal, there is a genuine determination to make our waters as pure as possible. Environmental agencies have set limits for many common industrial pollutants, and as methods of pollution reduction have become more successful in reducing or removing pollutants from waste water, environmental regulations have become more stringent, resulting in an ever tightening spiral whose goal is to reduce pollutants in waste water to that minimum which is technologically feasible.

Among the methods employed to reduce or remove pollutants, bioremediation constitutes an effective and highly desirable approach. Quite broadly, in bioremediation pollutants serve as a food source, generally as a source of carbon and/or nitrogen, for microorganisms. Bacterial metabolism converts the pollutants to metabolites generally with a simple chemical structure, sometimes degrading the pollutants completely to carbon dioxide and water in an aerobic process, or to methane in an anaerobic process. But in any event, the metabolites usually have no adverse environmental effects.

Various bioremediation processes are known. For example, U.S. Pat. No. 4,634,672 describes biologically active compositions for purifying waste water and air which comprises a polyurethane hydrogel containing (i) surface active coal having a specific surface according to BET of above 50 m²/g, a polymer having cationic groups and cells having enzymatic activity and being capable of growth. U.S. Pat. No. 4,681,852 describes a process for biological purification of waste water and/or air by contacting the water or air with the biologically active composition of U.S. Pat. No. 4,634,672. The experimental examples of these patents indicate that the process is not effective for reducing contaminant concentrations in the effluent strain to less than 44 parts per million (ppm). This is not acceptable since the Environmental Protection Agency (EPA) in some instances has mandated that concentration for some contaminants (such as phenol) in the effluent stream must be as low as 20 parts-per-billion (ppb). (See Environmental Protection Agency 40 CFR Parts 414 and 416. Organic Chemicals and Plastics and Synthetic Fibers Category Effluent Limitations Guidelines, Pretreatment Standards, and New Source Performance Standards. Federal Register, Vol. 52, No. 214, Thursday, Nov. 5, 1989. Fules & Regulations, 42522.

Both U.S. Pat. Nos. 3,904,518 and 4,069,148 describe the addition of activated carbon or Fuller's earth to a suspension of biologically active solids (activated sludge) in waste water as an aid in phenol removal. The absorbents presumably act by preventing pollutants toxic to the bacteria from interfering with bacterial metabolic activity. The patentees' approach has matured into the so-called PACT process which has gained commercial acceptance despite its requisites of a long residence time, compious sludge formation with attendant sludge disposal problems, and the need to regenerate and replace spent carbon.

Rehm and coworkers have further refined the use of activated carbon in the aerobic oxidation of phenolic materials by using microorganisms immobilized on granular carbon as a porous biomass support system. Utilizing the propensity of microorganisms to grow on and remain attached to a surface, Rehm used a granular activated carbon support of high surface area (1300 m²/g) to which cells attached within its macropores and on its surface, as a porous biomass support system in a loop reactor for phenol removal. H. M. Ehrhardt and H. J. Rehm, Appl. Microbiol. Biotechnol., 21, 32–6 (1985). The resulting "immobilized" cells exhibited phenol tolerance up to a level in the feed of about 15 g/L, whereas free cells showed a tolerance not more than 1.5 g/L. It was postulated that the activated carbon operated like a "buffer and depot" in protecting the immobilized microorganisms by absorbing toxic phenol concentrations and setting low quantities of the absorbed phenol free for gradual biodegradation. This work was somewhat refined using a mixed culture immobilized on activated carbon [A. Morsen and H. J. Rehm, Appl. Microbiol. Biotechnol., 26, 283–8 (1987)] where the investigators noted that a considerable amount of microorganisms had "grown out" into the aqueous medium, i.e., there was substantial sludge formation in their system.

Suidan and coworkers have done considerable research on the analogous anaerobic degradation of phenol using a a packed bed of microorganisms attached to granular carbon [Y. T. Wang, M. T. Suidan and B. E. Rittman, Journal Water Pollut. Control Fed., 58 227–33 (1986)]. For example, using granular activated carbon of 16×20 mesh as a support medium for microorganisms in an expanded bed configuration, and with feed containing from 358–1432 mg phenol/L, effluent phenol levels of about 0.06 mg/L (60 ppb) were obtained at a hydraulic residence time (HRT) of about 24 hours. Somewhat later, a beri-saddle-packed bed and expanded bed granular activated carbon anaerobic reactor in series were used to show a high conversion of COD to methane, virtually all of which occurred in the expanded bed reactor; P. Fox, M. T. Suidan, and J. T. Pfeffer, ibid., 60, 86–92, 1988. The refractory nature of ortho-cresols and meta-cresols toward degradation also was noted.

Givens and Sack, 42nd Purdue University Industrial Waste Conference Proceedings, pp. 93–102 (1987), per-formed an extensive evaluation of a carbon impregnated polyurethane foam as a microbial support system for the aerobic removal of pollutants, including phenol. Porous polyurethane foam internally impregnated with activated carbon and having microorganisms attached externally was used in an activated sludge reactor, analogous to the Captor and Linpor processes which differ only in the absence of foam-entrapped carbon. The process was attended by substantial sludge formation and without any beneficial effect of carbon.

The Captor process itself utilizes porous polyurethane foam pads to provide a large external surface for microbial growth in an aeration tank for biological waste water treatment. The work described above is the Captor process modified by the presence of carbon entrapped within the foam. A two-year pilot plant evaluation of the Captor process itself showed substantial sludge formation with significantly lower microbial density than had been claimed. J. A. Heidman, R. C. Brenner and H. J. Shah, *J. of Environmental Engineering*, 114, 1077–96 (1988). A point to be noted, as will be revisited below, is that the Captor process is essentially an aerated sludge reactor where the pads are retained in an aeration tank by screens in the effluent line. Excess sludge needs to be continually removed by removing a portion of the pade via a conveyor and passing the pads through pressure rollers to squeeze out the solids.

H. Bettmann and H. J. Rehm, Appl. Microbial. Biotechnol., 22, 389–393 (1985) have employed a fluidized bed bioreactor for the successful continuous aerobic degradation of phenol at a hydraulic residence time of about 15 hours using *Pseudomonas putida* entrapped in a polyacrylamide-hydrazide gel. The use of microorganisms entrapped within polyurethane foams in aerobic oxidation of phenol in shake flasks also has been reported; A. M. Anselmo et al., Biotechnology B.L., 7, 889–894 (1985).

Known bioremediation processes suffer from a number of inherent disadvantages. For example, a major result of increased use of such processes is an ever increasing quantity of sludge, which presents a serious disposal problem because of increasingly restrictive policies on dumping or spreading untreated sludge on land and at sea. G. Michael Alsop and Richard A. Conroy, "Improved Thermal Sludge Conditioning by Treatment With Acids and Bases", *Journal WPCF*, Vol. 54, No. 2 (1982), T. Calcutt and R. Frost, "Sludge Processing—Chances for Tomorrow", *Journal of the Institute of Water Pollution Control*, Vol. 86, No. 2 (1987) and "The Municipal Waste Landfill Crisis and A Response of New Technology", Prepared by United States Building Corporation, P.O. Box 49704, Los Angles, Calif. 90049 (Nov. 22, 1988). The cost of sludge disposal today may be several fold greater than the sum of other operating costs of waste water treatment.

Use of anaerobic sewage treatment systems has been offered as a solution to the sludge problem. William J. Jewell "Anaerobic Sewage Treatment", *Environ. Sci. Technol.*, Vol. 21, No. 1 (1987). The largest difference between aerobic and anaerobic systems is in cellular yield. More than half of the substrate removal by aerobic systems can yield new microbial mass or sludge, the yield under anaerobic conditions is usually less that 15% of the organic substances removed. However, anaerobic systems are limited in the number of substrate that they can degrade or metabolize such as non-substituted aromatics (See N. S. Battersby & V. Wilson. "Survey of the anaerobic biodegradation Potential of Organic Chemicals in Digesting Sludge." *Applied & Environmental Microbiology*, 55(2):p. 433–439, February 1989. This is a significant disadvantage in that most industrial processes such as coke production and coal tar processing normally produce non-substituted aromatics as by-products (See J. M. Thomas, M. D. Lee, M. J. Scott and C. H. Ward, "Microbial Ecology of the Subsurface at an Abandoned Creosote Waste Site." *Journal of Industrial Microbiology*, Vol. 4, p. 109–120, 1989.

Another disadvantage inherent in some known bioremediation processes is that these processes do not reduce the levels of organic pollutants to reasonable levels [preferable less than about 0.1 parts per million (ppm)] at reasonable residence times (preferably less than about 24 hours). For example, in the process of U.S. Pat. Nos. 4,681,851 and 4,634,672 (See the specific examples), the concentration of phenol contaminants was not reduced below about 44 ppm.

U.S. Pat. No. 2,812,031 relates to the extraction of phenolic materials from aqueous solutions by means of polyurethane foam in the presence of hydrophilic fibers. The patent states that while polyurethane foams are relatively hydrophobic which can interfere with the interficial contact which is necessary to permit adsorption, the problem is overcome through the use of hydrophilic fibers which enable the materials to come into close and in intimate contact with the surfaces of the polyurethane to facilitate wetting thereof.

U.S. Pat. No. 3,617,531 relates to a method for the selective adsorption of phenol from hydrocarbon solutions. In this method, the solution is contacted with a polyurethane foam.

SUMMARY OF THE INVENTION

This invention relates to a process for purification of waste water by aerobic biodegradation and an biomass and apparatus for use in the process. More particularly, the process of this invention comprises:

passing an aqueous feed stream containing one or more organic materials through a reactor in the presence of a gas comprising an effective amount of oxygen, said reactor containing a biologically active biomass comprising a plurality of biologically active particles comprising a "hydrophobic polyurethane" substrate in particulate form in the absence of or in the substantial absence of an absorbent for the materials such as carbon or a hydrophilic material and having on, in or on and in said substrate and/or said absorbent an effective amount of one or more aerobic microorganisms capable of metabolizing at least one of said organic materials in said feed stream to provide an effluent stream in which the concentration of at least one of said materials is less than the concentration of said material in said feed stream.

Another aspect of this invention relates to an apparatus for purification of an aqueous feed stream by aerobic biodegradation which comprises:

a reactor having an intet for in-flow of an aqueous feed stream containing one or more organic materials and an outlet for out-flow of an effluent stream in which the concentration of at least one of said materials is less than the concentration of said material in said feed stream and having contained in said reactor a biologically active biomass comprising a plurality of biologically active particles comprising a "hydrophobic polyurethane" in particulate form having an effective amount of aerobic microorganisms capable of metabolizing at least one of said organic materials in, on or on and in said hydrophobic polyurethane.

Yet another aspect of this invention relates to a biologically active biomass for reducing the concentration of one or more organic materials in an aqueous feed stream said biomass comprising a plurality of biologically active particles comprising a "hydrophobic polyurethane" in particulate form having an effective amount of one or more aerobic microaroganisms capable of metabolizing at least one of said materials in, on or on and in said "hydrophobic polyurethane" particles.

Several advantages flow from the process of this invention. One unique advantage of this invention is that the process can be used to reduce relatively high levels of organic materials in an aqueous feed stream to relatively low levels in the absence or in the substantial absence of absorbants for the materials such as powdered activated carbon. This is indeed surprising in view of the teachings of U.S. Pat. No. 4,983,299 which specifically teaches the use of an absorbent such as carbon.

Another advantage of this invention is that significant reductions in levels of organic contaminants contained in the effluent stream are obtained with reasonable hydraulic residence times as compared to prior art processes as for example, the processes described in U.S. Pat. Nos. 4,634,672 and 4,681,851. For example, experimentation has demonstrated that in certain preferred embodiments of the invention, the level of effluent phenol in phenol contain aqueous waste streams can be reduced to concentrations as low as 20 parts per billion at hydraulic residence times as short at 16 hours. This is also not a trivial benefit especially in view of the low levels of various organic pollutants such as phenol in aqueous waste streams from industrial processes set by the Environmental Protection Agency and the econimic requirement that these reduced levels be obtained over reasonable time periods.

Yet another benefit which flows from this invention is that the aqueous stream being treated by the process may contain relatively high levels of organic contaminants. For example, in certain preferred embodiments of this invention, levels of organic pollutants in the feed stream can be as high as about 5000 parts-per million (ppm) reduced to levels as low as 1 ppm, or 0.1 ppm or for that matter 20 parts-per-billion (ppb). This advantage is of immediate and substantial economic benefit in that it obviates the need for time consuming and expensive pretreatment processes for reducing the amount of contaminant in the aqueous stream directly exiting the manufacturing process before introducing the stream into a bioremediation process.

Still another advantage of the process of this invention is that the process is relatively resistant to surges in the concentration of the organic materials in the feed stream or in other words upset. During the operation of the process of this invention, the concentration of the material may vary and the concentration of material may increase periodically to relatively high levels, or to levels which are toxic to the microorganism which can result in death of the microorganism. A further result of such surges is that system may not meet specifications with regard to the concentration of the materials in the effluent stream. Due to the absorptive capabilities of the hydrophobic polyurethane substrate the adverse effects of these surges in concentration are minimized.

As measured by its performance characteristic relative to prior art processes, the process of this invention is a marked improvement over the prior art and relative to the prior art represents a difference in kind rather than a difference in degree.

BRIEF DESCRIPTION OF THE DRAWINGS

The invention will be more fully understood and further advantages will become apparent when reference is made to the following detailed description of the invention and the accompanying drawings in which:

FIG. 12 is a CPMAS C-$^{13}$ NMR a specturm of a hydrophilic foam.

FIG. 13 is a CPMAS C-$^{13}$ NMR spectrum of a hydrophoblic foam.

FIG. 14 is a 1-pulse MAS C-$^{13}$ specturm of carbon impregnated hydrophilic foam and carbon impregnated hydrophobic foam after exposure to phenol.

DETAILED DESCRIPTION OF THE PREFERRED EMBODIMENTS OF THE INVENTION

Figure 1:
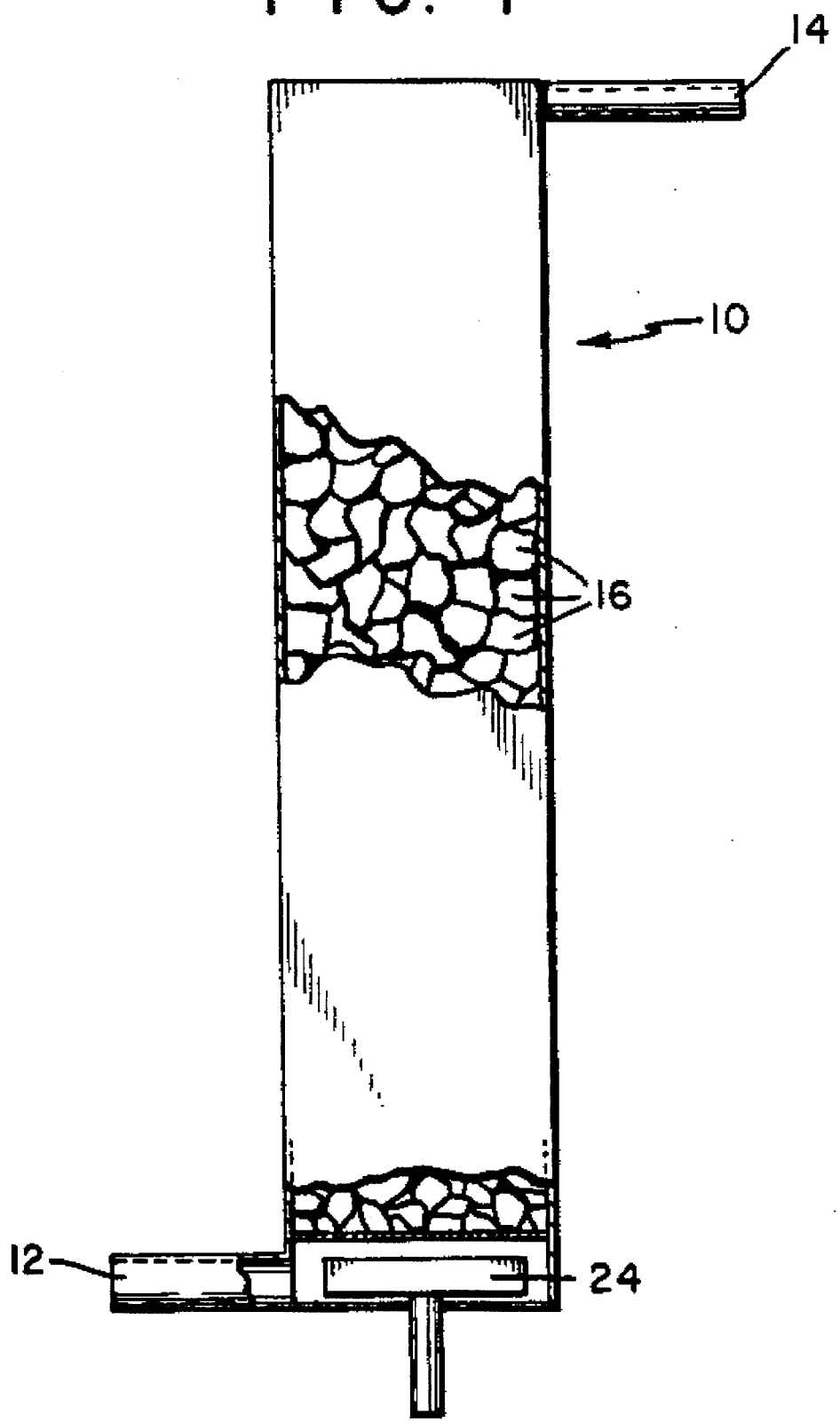
FIG. 1 is a cross-sectional side view of a vertical reactor for use in a preferred embodiments of the invention.
Figure 2:
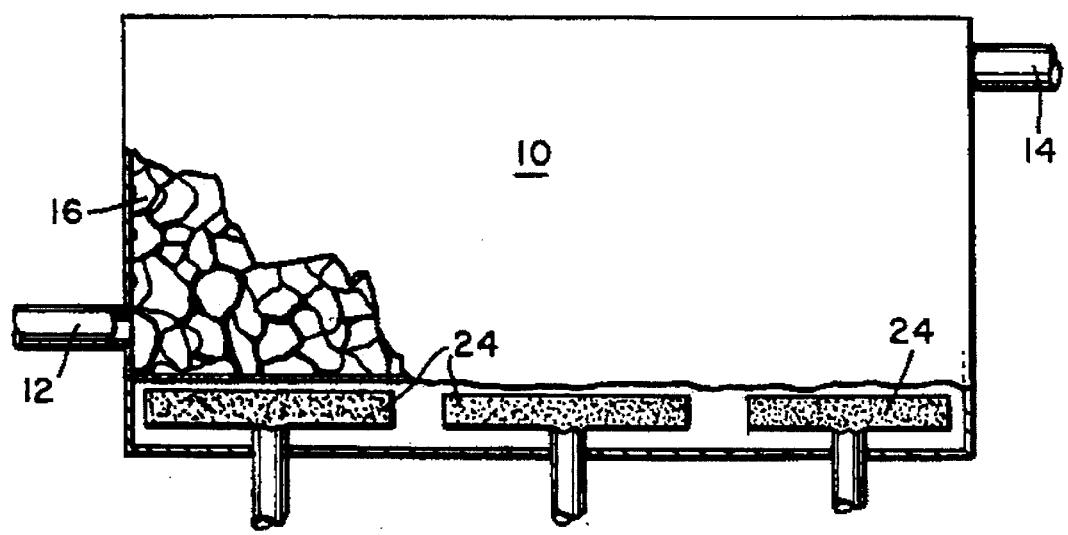
FIG. 2 is a cross-sectional side view of a horizontal reactor for use in the process of this invention.
Figure 3:
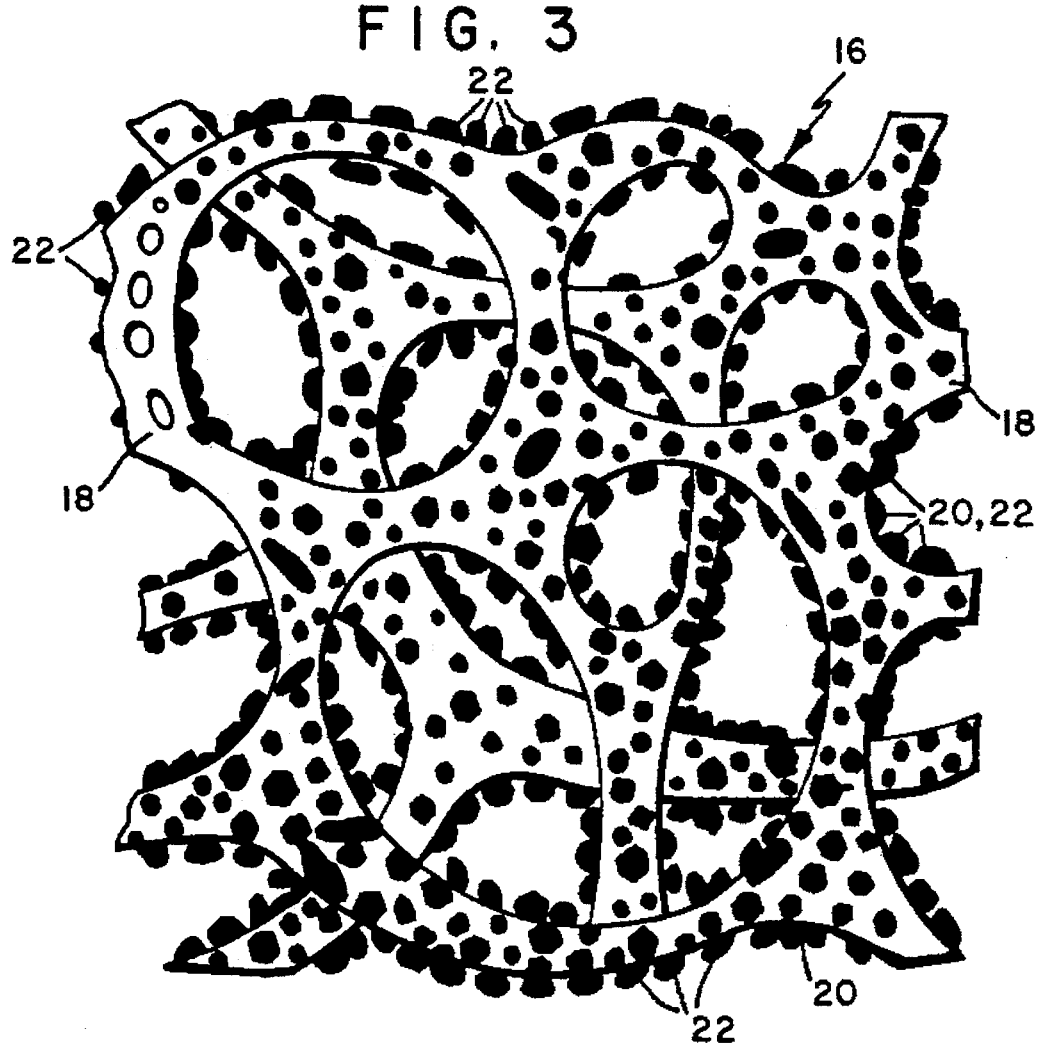
FIG. 3 is a perspective view of a preferred biologically active particle for use in the process of this invention.

The present invention will be better understood by those of skill in the art by reference to the figures. Referring to FIGS. 1 and 2, the numeral 10 indicates a reactor for use in the process of this invention. In FIGS. 1 and 2, reactor 10 is a fixed bed reactor which is employed in the preferred aspects of this invention. However, in the practice of this invention reactor design and configuration may vary widely and other reactor design such as stirred to tank, fluidized bed and the like may be conveniently used in the practice of this invention. In the process, an aqueous waste stream containing one or more organic materials is introduced into reactor 10 via inlet 12, passes through reactor 10 and exits the reactor via exit 14 in the presence of a gas comprising an effective amount of oxygen at a rate sufficient to reduce the concentration of at least one of the materials in the effluent stream to the desired levels. Reactor 10 contains a plurality of biologically active particles in a identified in FIGS. 1 and 2 by the numeral 16. As depicted in FIG. 3, biologically active particles 16 comprise a hydrophobic polyurethane substrate 18. Also as depicted in FIG. 3, substrate 18 is preferably porous of open cell construction. Biologically active particles 16 also include one or more types of aerobic microorganism 22 on, in or on and in substrate 18 and/or absorbent 20 which are capable of metabolizing at least one of the materials contained in the waste stream.

The process is carried out in the presence of a gas comprising an effective amount of oxygen. As used herein, an "effective amount of oxygen" is an amount of oxygen which is sufficient to supply the metabolic requirement oxygen for the micro-organisms metabolizing of the target pollutant. It is important that reactor 10 be oxygenated to provide the necessary amount of oxygen for proper microbial metabolism and pollutant degradation. The amount of oxygen required in any situation will vary widely and will depend to a significant extent on the requirements of the particular microorganism(s) employed in the process and other factors known to those of skill in the art. In general, the amount of oxygen distributed in the process feed stream is at least about 2 mg of oxygen per liter of aqueous feed. In the preferred embodiments of the invention, the amount of oxygen is from about 5 mg per liter of feed to about 10 mg per liter of feed and in the most preferred embodiments of the invention, the amount of the oxygen is from about 6 mg/liter of feed to about 8 mg/liter of feed. In the preferred embodiments of this invention, the gas is distributed uniformly or substantially uniformly throughout all or a portion of the biologically active biomass. The manner in which the gas is introduced into reactor 10 may vary widely. The gas may be introduced into reactor 10 employing conventional methods. For example, in the vertical or up-flow reactor 10 of FIG. 1, the gas is introduced into reactor 10 with the aqueous feed stream at the bottom of the reactor 10 through use of sparger 24 which introduces the gas in the form of small diameter gas bubbles. Supplemental gas can be introduced, if required, at various points along the vertical length of reactor 10 (not depicted in the drawing). In the embodiment of the invention in which reactor 10 is a horizontal reactor as for example the reactor of FIG. 2, the gas can be introduced along the horizontal length of reactor 10 at various points to achieve a substantially uniform distribution of the gas in the feed stream in reactor 10. In this embodiment, the up-flow of the gas is orthogonal or substantially orthogonal to the direction of the flow of the aqueous feed stream. In the most preferred embodiments of the invention, reactor 10 is in a horizontal configuration in which the gas is distributed uniformly or substantially uniformly throughout all or substantially of reactor 10. In these most preferred embodiments the gas is introduced into reactor 10 along the horizontal length of reactor 10 as depicted in FIG. 2. In this mode, a more uniform distribution of the gas in the feed stream is achieved.

In the most preferred embodiments of the invention, the length of reactor 10 is greater than the height of reactor 10 and the ratio of length of reactor 10 to the height of reactor 10 is selected to achieve the desired distribution of gas in reactor 10. In general, the height of reactor 10 is from about 0.5 m to about 8 m and the ratio of length to height is from about 7:1 to about 2:1. In the preferred embodiments of the invention, the height of reactor 10 is from about 1 m to about 6 m and the ratio of length to height is from about 6:1 to about 3:1; and in the particularly preferred embodiments of the invention, the height of reactor 10 is from about 2 m to about 5 m and the ratio of length to height is from about 5:1 to about 3:1. Amongst these particularly preferred embodiments of the invention, most preferred ar those embodiments in which the height of the reactor is from about 2.5 m to about 4.5 m and the ratio of length to height is from about 4:1 to about 5:1.

Process temperatures may vary widely and will depend on the particular microorganisms chosen for use. In general, the process is carried out at a temperature sufficiently high so as to not unduly interfere with the metabolism of the microorganism and sufficiently low as to not kill the microorganism. Process temperatures are usually from about 5° C. to about 65° C. Process temperatures are preferably in the range of from about 15° C. to about 65° C., more preferably in the range of from about 20° C. to about 40° C. and most preferably in the range of from about 25° C. to about 35° C.

The aqueous organic pollutant-containing stream is treated in the process of this for a time sufficient to reduce concentration levels of at least one of the pollutants in the effluent stream the desired extent. In general, with aqueous feed streams in which the concentration levels of at least one pollutant is equal to or less than about 5000 ppm a hydraulic residence time of less than about 30 hours, preferably less than about 24 hours, and more preferably less than about 15 hours, suffices to attain a concentration for at least one pollutant in the effluent stream to equal to or less than about 22 parts per million, more preferably equal to or less than about 1 ppm, and most preferably equal to or less than about 0.1 ppm. With an effluent concentration of equal to or less than about 0.02 ppm is the concentration of choice. The particular hydraulic residence time depends upon the amount and type of organic materials in the feedstock, operating temperature, the presence of other materials in the feedstock, the density of microorganisms in the and so forth.

The process of this invention preferably results in relatively low sludge production as measured by the test procedure "209-C Total Suspended Solids Dried at 103°–105° C." described in *Standard Methods For The Examination of Water and Wastewater*, 10th Edition published by American Pablic Health Association, 1015 Fifteenth Street NW, Washington, D.C. 20025 pp. 96 and 97. After 120 days of continuous or substantially continuous operation, the amount of suspended sludge in the effluent stream is preferably equal to or less than about 600 mg/L. In the more preferred embodiments of the invention, the amount of suspended sludge in the effluent stream is equal to or less than about 400 mg/L, and in the most preferred embodiemtns of the invention, the amount of suspended sludge is equal to or less than about 200 mg/L. In those embodiments of choice, the amount of suspended sludge is equal to or less than about 100 mg/L.

The aqueous waste streams which may be treated in the process of this invention and the organic pollutants contained in such streams may vary widely. The only requirement is that at least one of the pollutants can be degraded or metabolized by an aerobic microorganism and is absorbed, adsorbed or absorbed and adsorbed on the substrate comprising the hydrophobic polyurethane substrate. Illustrative of such pollutants are phenolic materials such as phenol, the cresols, resorcinols, catechol, halogenated phenols as for example, 2-chlorophenol, 3-chlorophenol, 4-chlorophenol, 2,4-dichlorophenol, pentachlorophenol, nitrophenols as 2-nitrophenol and 4-nitrophenol and 2,4-dimethylphenol. Another important class of organic pollutants consists of aromatic hydrocarbons, such as benzene, toluene, xylenes, ethylbenzene, and so forth. Polynuclear aromatic hydrocarbons are an important subclass as represented by naphthalene, anthracene, chrysene, acenaphthylene, acenaphthene, phenanthrene, fluorene, fluoranthene, naphthacene, and pyrene. Still other pollutants are halogenated alkanes such as trichloroethane and the like. In the preferred embodiments of this invention the pollutants are those which are common in waste streams from industrial manufacturing facilities. For example, various substituted and unsubstituted phenols such as phenol, chlorophenols and nitro-phenols, and aromatics such as benzene are preferred pollutants for treatment in the process of this invention, and substituted and unsubstituted phenols, especially phenol, are the most preferred pollutants. Phenol is found in waste streams of phenol manufacturers, of phenol users as phenol resin producers, of coal tar processing facilities, of wood pulping plants and other facilities practicing delignification. This is not to say that the process can or must be practiced only on such streams. The process which is the invention herein may be practiced on any aqueous feed containing levels of organic pollutants which are to be reduced.

The initial concentration of pollutants contained in the aqueous waste stream used in the process of this invention may vary widely. One of the advantages of this invention relative to prior art bioremediation processes is that waste streams containing relatively high amounts of pollutants can be treated. The concentration of organic pollutants in process streams treatable in the process of this invention are "biologically treatable levels". As used herein, "biologically treatable levels" are pollutant concentrations which do not inhibit or excessively inhibit the metabolism of the pollutants by the microorganism. Effluent streams from industrial processes such as phenol manufacturing plants and coal tar processing plants may have pollutant levels in excess of 20,000 ppm which may interfere with the process. It is preferred to reduce these levels to biologically treatable levels through use of conventional procedures such as solvent extraction, steam distillation and the like. In general, the concentration of pollutants in the aqueous streams is equal to or less than about 5000 ppm. Obviously, the lower concentration is not critical and does not represent a limitation on the process. In the preferred embodiments of this invention, the concentration of organic pollutants is equal to or less than about 4000 ppm, and in the particularly preferred embodiments of the invention the concentration of pollutants is equal to or less than about 3000 ppm. Amongst these particularly preferred embodiments of the invention, most preferred are those in which the concentration of pollutants is equal to or less than about 2000 ppm with a pollutant concentration of equal to or less than about 500 ppm being being the concentration level of choice.

The pH of the pollutant-containing feed may need to be adjusted for optimum biodegradation. In general, the pH is within the pH range allowing metabolism of the target pollutant(s). In the preferred embodiments of the invention, the pH of the feed is from about 6 to about 9, and in the most preferred embodiment of the invention, the pH of the feed is from about 6.5 to about 7.5.

Nutrients may need to be provided. Such materials may be added through use of known additives such as fish meal peptine, soybean flour, peanut oil, cotton seed oil, and usually salts capable of providing phosphate, sodium, potassium, ammonium, calcium, sulfate, chloride, bromide, nitrate, carbonate or like ions. Usually sufficient amounts often are present in the aqueous feed to satisfy minimum requirements of the microorganism.

The aqueous feed stream is introduced into reactor 10 employing conventional means and is passed through the reactor employing an "effective hydraulic retention time". As used herein, an "effective hydraulic retention time" is a time which is sufficient for the process to reduce the concentration of pollutants in the effluent stream to the desired levels. Hydraulic retention times may vary widely and in general depend on such factors as the concentration pollutants in the aqueous feed stream, desired maximum concentration of pollutants in the aqueous effluent stream, the microorganisms contained in the biomass, the pollutant, and the like. An advantage of the process of this invention is that reductions in pollutant concentration can be obtained with relatively short hydraulic retention times. In the preferred embodiments of this invention, hydraulic retention times are equal to or less than about 36 hrs, and in the particularly preferred embodiments of the invention such times are from about 10 to about 36 hrs. Amongst these particularly preferred embodiments of the invention, most preferred are those embodiments in which the hydraulic retention time is from about 10 to about 24 hrs.

The type of reactor 10 used in the process of this invention is not critical in providing the advantages of this invention. Any reactor design including stirred tank, fixed bed and fluidized bed may be used. In the preferred embodiments of the invention, reactor 10 is a fixed bed reactor or substantially a fixed bed reactor. As used herein a "fixed bed reactor" is a reactor in which the plurality of biologically active particles are stationary or substantially stationary as the feed flows through the reactor. In the more preferred embodiments of the invention were reactor 10 is a fixed bed reactor, the length of the path traversed by the aqueous stream as it passes through the reactor and the width of the stream are such that reactor 10 has "plug flow characteristic" or substantially "plug flow characteristics". As used herein, the "plug flow characteristics" are achieved when all or substantially all of the mixing in reactor 10 occurs in the plane perpendicular to or substantially perpendicular to the plane of feed flow and there is no or substantially no mixing in the plane of feed flow. See Ed Shroeder, "Waste Water Treatement", McGraw Hill, (1980).

Figure 4:
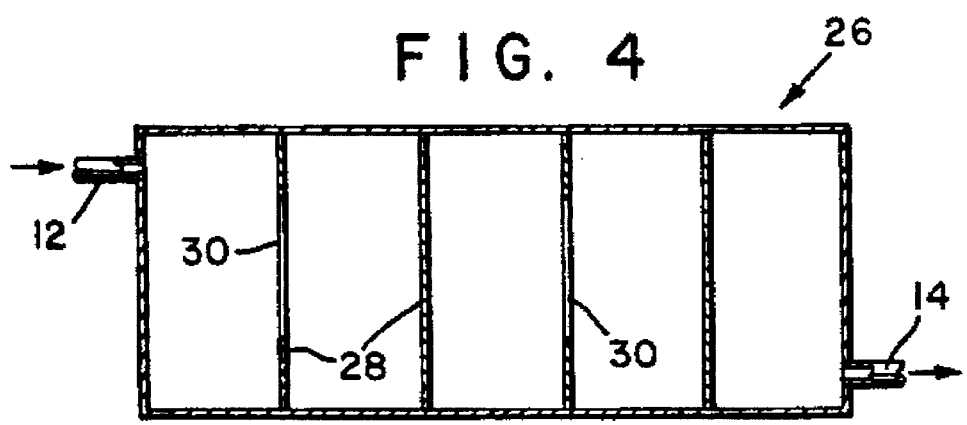
FIG. 4 is a cross-sectional top view of a reactor for use in the process of this invention having a cascading design.
Figure 5:
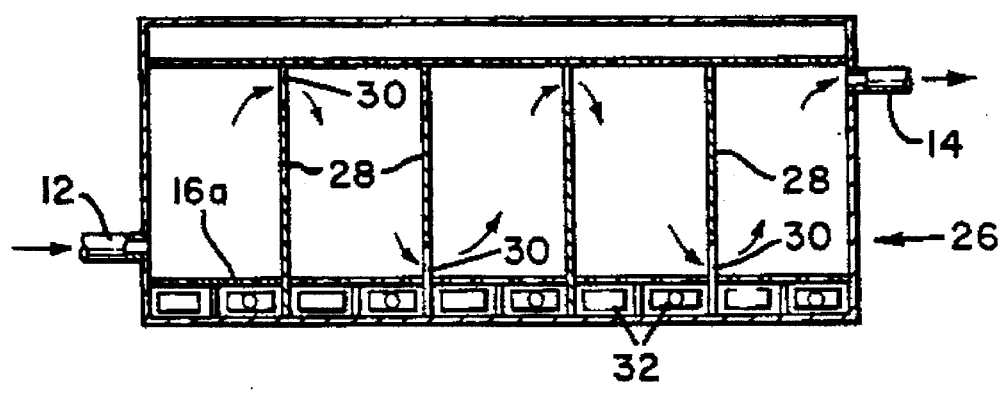
FIG. 5 is a side cross-sectional view of the reactor of FIG. 4.

In general, plug flow can be achieved in a number of ways, all of which can be utilized in the practice of the preferred embodiments of this invention. For example, in reactor 10 of FIGS. 1 and 3, plug flow is achieved in a vertical or horizontal reactor with a relatively high reactor length to reactor width ratio, such as a length to width ratio of at least about 2 to 1, in which the length of reactor 10 is in the direction of feed flow, and the width of the reactor is perpendicular to the direction of feed flow. In reactor 10 of FIGS. 1 and 3, the length of the reactor is the length of the path traversed by the feed stream as it passes through reactor 10 and the width of reactor 10 is the width of the stream. However, the actual length and the actual width of reactor 10 need not be equal to the length and width of the feed stream and the desired length to width ratio can be achieved by other means. Examples of these alternative embodiments are set forth in FIGS. 4 to 8. In FIGS. 4, 5 nd 6 is depicted a reactor 26 having a segmented design to achieve plug flow characteristics, corresponding parts being referred to by the like numerals as in the reactor of FIGS. 1 and 2. Reactor 26 is of a cascade design and includes inlet 12 and outlet 14. The length of the path traversed by the feed stream is lengthened through use of a plurality of cascades 28 which extend perpendicular to the length of reactor 26. As the feed passes through reactor 26, it traverses reactor 26 both horizontally and vertically along the length of a first cascade 28, through opening 30 and along the length of the next adjacent cascade 28 until the aqueous stream exits reactor 26 through opening 14. This design eliminates or substantially eliminates back mixing between the sections defined by the walls of adjacent cascades 28. The minimum number of sections required to achieve the desirable plug-flow conditions and performance efficiency is about four. However, more sections can be incorporated into reactor 26 which would result in greater plug-flow characteristics. From a practical and economic point of view, usually not more than ten sections are used. To provide for uniform or substantially uniform distribution of the gaseous composition in reactor 26, reactor 26 includes a plurality of gaseous sparging units 32 along its horizontal length at the bottom of reactor 26.

Figure 6:
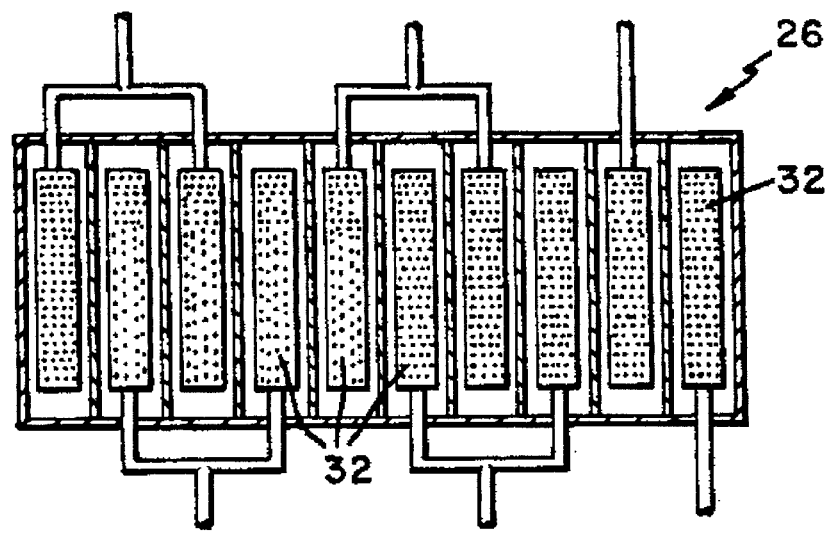
FIG. 6 is a top view of the reactor of FIG. 3 depicting the oxygenation system of the reactor of FIG. 4.
Figure 7:
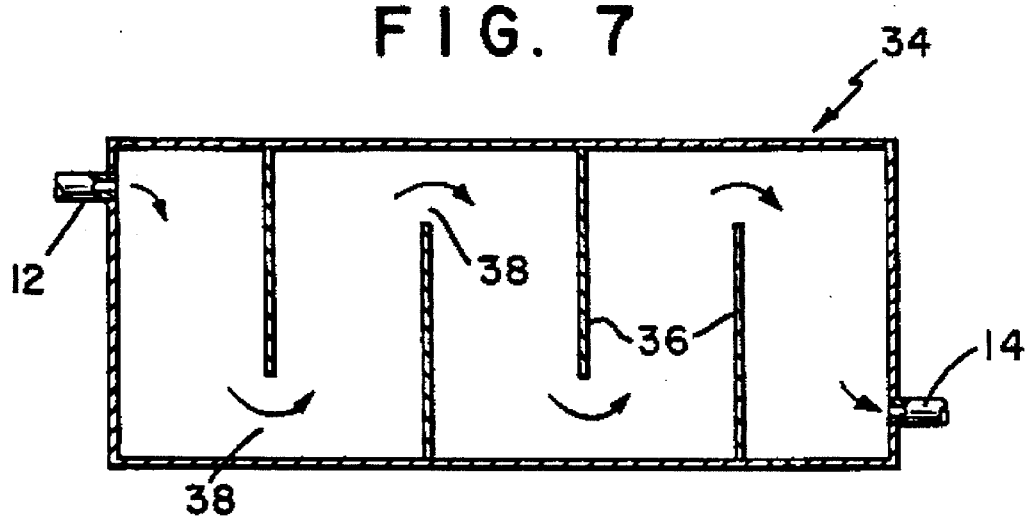
FIG. 7 is a cross-sectional top view of a reactor for use in a preferred embodiment of this invention having baffles.
Figure 8:
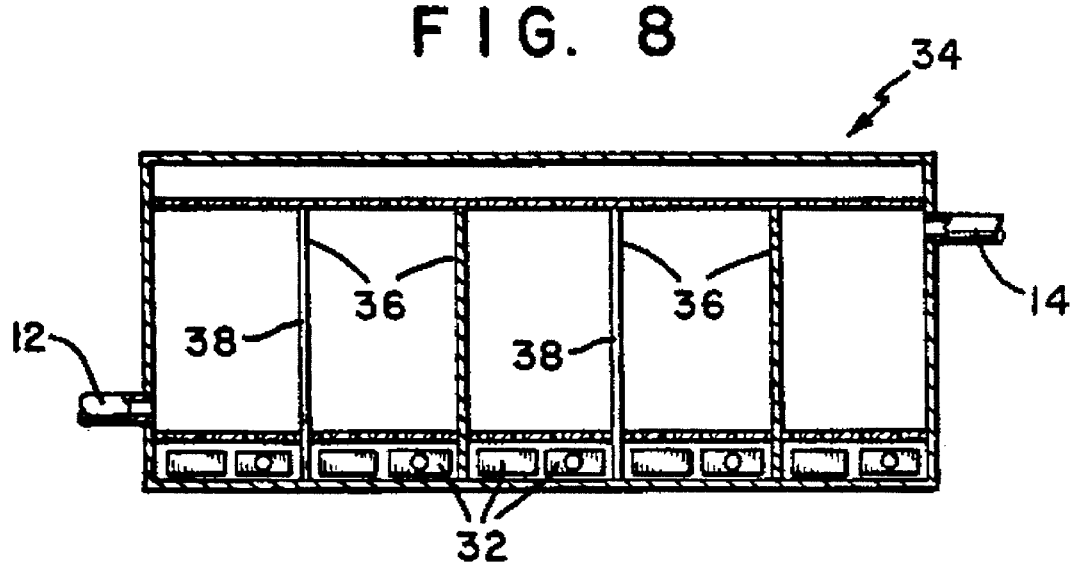
FIG. 8 is a side cross-sectional view of the reaction of FIG. 7.

FIGS. 7 and 8 show a fixed bed reactor 34 which differs from reactor 26 of FIGS. 4 to 6 in that the length of the path traversed by the feed stream as it traverses reactor 34 is increased through the use of baffles 36, corresponding parts being defined by like numerals. The feed stream is introduced in reactor 34 at inlet 12. As the feed stream passes through the reactor 34, it traverses both the horizontally along the length of each baffle 36, through opening 38 along the length of the next baffle 36 and through the next opening 38 and so on along the length of each subsequent baffle 36 and through each subsequent opening 38 until the feed stream exits reactor 34 through outlet 14. As in the case of reactor 26, a uniform distribution or substantially uniform distribution of gas is achieved by sparging units 32 along the horizontal length of reactor 34.

The ratio of length of the feed stream to width of the stream in the preferred fixed bed reactor is at least about 2:1. In the more preferred embodiments of this invention, the ratio of length of the feed stream to width of the feed stream is from about 2:1 to about 15:1. In the particularly preferred embodiments of the invention, the ratio of length of the feed stream to width of the feed stream is from about 3:1 to about 10:1. In the most preferred embodiments of this invention, the ratio of length of the feed stream to width of the feed stream is from about 5:1 to about 8:1.

The biologically active composition for use in the process of this invention comprises a plurality of biologically active particles 16 as used herein. Particle size can vary widely depending on the size of the reactor. The size of the particle is such that relative sizes of the particles and the reactor selected for use in such that the reactor may contain a plurability of particles. As depicted in FIG. 3, in the preferred embodiments of this invention particles 16 comprise a hydrophobic polyurethane substrate 18, and having aerobic micro-organisms 22 (which are capable of growth and of metabolizing at least one of the organic pollutants) on, in or on and in substrate 18 in the absence of a carbon absorbent for one or more of the organic material pollutants in or on and in the hydrophobic polyurethane substrate.

Microorganisms 20 used in the practice of this invention, are aerobic microorganisms selected to degrade the target pollutants in ways well known to those of skill in the art. Useful microorganisms 20 may vary widely and may be naturally occurring microorganisms 20 or may be genetically engineered microorganisms 20. The only requirement is that microorganisms 20 are aerobic and are capable of metabolizing the target pollutant(s) to the required effluent levels over the required period of time. In the preferred embodiments of the invention, microorganism 22 are obtained from the pollutant-containing waste stream or from soil which has been in contact with the waste stream.

In the operation of the process, the cell content of microorganisms 22 is an amount which is sufficient to reduce the organic pollutant content to the desired concentration level within the desired hydraulic retention time. Of course, initially it is only necessary to innoculate substrate 18 with an amount of microorganisms 20 to result in an operative amount of microorganisms 20 within a reasonable period of time. In the preferred embodiments of the invention, cell content of microorganisms 20 is at least about 0.3% by weight based on the total weight of microorganisms 22, and substrate 18, and in the most preferred embodiments of the invention is from about 0.3% by weight to about 15% by weight on the aforementioned basis. Among these particularly preferred embodiments most preferred are those embodiments in which the cell content of microorganisms 20 is from about 0.5 to about 10% by weight based on the total weight of microorganisms 22 and substrate 18, with a content of from about 0.8 to about 5% by weight on the aforementioned basis being the amount of choice.

Substrate 18 used in the practice of this invention is in particulate form. As used herein, "in particulate form" merely means that the size of the substrate is less than that of the reactor selected for use such that the relatively size of the substrate and reactor is such that the reactor may contain a plurability of biologically active particles. The size and shape of substrate 18 can vary widely in longitudinal dimension of length and traverse dimensions of thickness, width and diameter. For example, substrate 18 may be in particulate form of regular shape such as cubular, rod shaped, rectangular, spherical, hexagonal or the like, or may be of irregular shape. The particle size (length, thickness, width and/or diameter) may vary widely and is not critical and depends on the reactor size. Particle size is preferably from about 0.10 in. to about 6 in. More preferred particle sizes are from about 0.2 in. to about 3 in., and most preferred particle sizes are from about 0.50 in. to about 2 in. with a particle size of from about 0.50 in. to about 1 in. being the particle size of choice.

In the preferred embodiments of the invention, where all or a portion of microorganisms 20 and absorbent 20 are incorporated in substrate 18, substrate 18 is preferably an open cell material having a relatively high macro porosity, as for example a foam. This allows the pollutant-containing aqueous feed to flow through the interior of the substrate. In the preferred embodiments of the invention, substrate voids are at least about 1 millimeters in size, and are preferably are on the order of from about 1 to about 8 millimeters more preferably from about 2 to about 6 millimeters and most preferably from about 5 to about 6 millimeters in size.

Substrate 18 is preferably porous. In the preferred embodiments of this invention substrate 18 includes from about 5 to about 60 pores per square inch. The number of pores per square inch is more preferably from about 8 to about 30, and most preferably from about 10 to about 20. In the embodiments of choice, the number of pores per square inch is from about 10 to about 15.

Substrate 18 is preferably resistant to the shear forces and abrasion present in the reactor, and preferably has good crush strength. In these preferred embodiments of the invention, substrate 18 is preferably semiflexible, with a density of under about 2 pounds per cubic foot for optimum economic feasibility. However, higher density substrates, of from about 4 to about 5 pounds per cubic foot or even higher, are usable. It should be realized that substrate density is related to the economics of the invention and not to its performance; the invention may be practiced with a large range of substrate densities, even if certain ranges may present distinct economic advantages.

The material used to form substrate 18 is critical and is a "hydrophobic polyurethane". As used herein, "hydrophobic polyurethanes" are family of polymers containing repeat urethane groups of the formula:

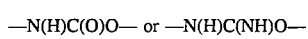

preferably of the formula:

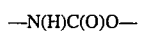

Hydrophobic polyurethane are those which cannot be wetted by water. That is a droplet of water on the surface of the polyurethane has an angle of contact of greater than 0° and preferably greatet than 90° as measured by a goniometer. The use of a hydrophobic polyurethane is critical to providing the advantages of this invention. Surprisingly, it has been discovered that hydrophobic polyurethanes adsorb certain organic pollutant such as phenol); thus enhancing the effectiveness of the microorganism that metabolize the pollutant. The affinity of the hydrophobic polyurethane for the target pollutant is measured by adsorption of the target pollutant and whether it follows the Langmuir absorption curve. A hydrophobic polyurethane, follows the Langmuir adsorption curve. The Langmuir curve describes the absorption of the pollutant as a monolayer into the hydrophobic polyurethane. This can be described mathematically as;

$$Q = \frac{CN}{C + K_d}$$

where:

Q is the amount of target pollutant per unit of hydrophobic polyurethane.

C is the concentration of the target pollutant in solution at equilibrium conditions.

N is the maximum adsorbable amount of target pollutant at saturation conditions.

$K_d$ is the equilibrium concentration of the target pollutant when Q=N/2.

The values of N and $K_d$ can be determined from a plot of C/Q versus C thus:

$$C/Q = C/N + K_d/N$$

where:

the X intercept+$-K_d$ the Y intercept+$K_d$/N the $K_d$ value reflects the hydrophobic polyurethane affinity for the target pollutant. The hydrophobic polyurethane preferably exhibits a $K_d$ value of at least about 0.001 mg/L. More preferably the $K_d$ value ranges from about 0.001 to about 300 mg/L. Most preferably the $K_d$ value ranges from about 10 to about 150 mg/L. In particularly preferred embodiments, the $K_d$ ranges from about 10 to about 100 mg/L. It is important to optimize the $K_d$ value since the infinity of microorganism phenol, generally indicated as $K_s$, will generally be less than about 300 gm/L.

In order to optimize interaction between the hydrophobic polyurethane and the biodegradative microorganisms, the $K_d$ of the hydrophobic polyurethane needs to be slightly higher than the K, of the microorganism. If the $K_d$ of the hydrophobic polyurethane is well below that of the microorgansim the hydrophobic polyurethane will act to tightly bind the pollutant from the liuid phase but will not release them at a concentration at which the bacteria will have a high substrate utilization rate. If on the other hand the $K_d$ of the hydrophobic polyurethane is very large compared to the $K_s$ of the micro-organisms there will be a poor buffering effect at highshock loads of the pollutant and when the the target pollutant and when the concentration of the target pollutant is lower and approaches the $K_s$ of the microorganisms, the hydrophobic polyurethane will have a poor ability to concentrate of the target pollutant at its surface and thus stimulate microbial growth. An effective range of $K_s/K_d$ ratios is between 1:1 and 1:50. The more preferred range is between 1:1 and 1:20. The most preferred range is between 1:1 and 1:10. $K_s$ values and other biomass parameters are discussed in the following publications which are incorporated herein by references (1) D. Orhon et al., "The Effect of Reactor Hydranlics and the Performance of Activated Sludge Systems—I. The Traditional Modelling Approach" Wat. Res Vol 23, No. 12 pp. 1511 and 1512 (1989), (ii) Ren Der Yan et al., "Dynamic and Steady State Studies of Phenol biodegradation in Pure and Mixed Cultures", Biotechnology and Bioergineering, vol XVII, see pp. 1211–12 (1975) and (iii) Spectra, Jr., "Sensitivity Analysis of Biodegradation/Adsorption Models" Journal of Environmental Engineering, Vol. 116, No. 1 see pp. 32–39 (February 1990).

In the preferred embodiments of this invention, substrate 18 is formed from a hydrophobic polyurethane which can be foamed with an appropriate foaming agent such as nitrogen, helium, carbon-dioxide hydrophobic azodicarbonamide and the like, to form open foams having the void characteristics described above. In these preferred embodiments of the substrate 18 can be prepared and foamed in the of the selected microorganism without affecting same. In the preferred embodiments of the invention, hydrophobic polyurethane are those in which the molar ratio of carbon and hydrogen atoms to oxygen and nitrogen atoms in the polymeric backbone is greater than 1.4. The upper level of hydrophobicity of the polyurethane is not critical and in general hydrophobic polyurethanes having higher hydrophoblicity are preferred. In the preferred embodiments of this, the hydrophobic polyurethane are selected such that the molar ratio of carbon and hydrogen atoms to oxygen and nitrogen atoms is equal to or greater than about 2.0, and in the more preferred embodiments of this invention the ratio of carbon and hydrogen atoms to oxygen and nitrogen atoms in equal to or greater than about 2.5. Amongst the more preferred embodiments of this invention most preferred are those embodiments in which the molar ratio of carbon and hydrogen atoms to oxygen and nitrogen atoms is equal to or greater than about 3.0. Illustrative of useful polyurethanes are those derived from reaction of polyisocyanates such as toluene diisocyanates, diphenyl methane diisocyanates, hexamethylene 1,6-diisocyanate, dicyclohexylmethane diisocyanate, 1,5-naphalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidiene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyananodiphenylmethane and the like and polyols and polyamines such as glycerin, trimethylolpropane, 1,2,6-hexane triol, methyl glycoside, pentaerythritol, sorbitol, sucrose, ethylene glycol, diethylene glycol, hydroxy terminated polyesters formed by direct esterification of dicarboxylic acid with an excess of a disfunctional alcohol such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols such as those prepared by reaction of a compound having active hydrogens such as di-alcohols, poly-alcohols, di phenols, polyphenols, aliphatic diamines or polyamines and aromatic diamines or polyamines with alkylene oxides such as styrene oxide, butylene oxide, propylene oxide, epichlorohydrin or mixtures of these alkylene oxides, ethylene diamine, diethylene triamine, 4,4-phenylmethane diamine.

In the preferred embodiments of the invention, substrate 18 is formed from cross-linked polyurethane-hydrogels. Such materials can be obtained from commercial sources or prepared in accordance with known techniques. For example, such materials may be obtained by reacting isocyanate prepolymers with water in which diamines or polyamines are optionally contained as chain lengthening agents or as cross-linking agents or by reaction of a suitable polyol and a suitable poly isocyanate reagent, preferably a diisocyanate reagent. Suitable polyols include long chain aliphatic diols, and polyoxy alkylene ethers. The isocyanate prepolymers have isocyanate end-groups and are prepared by reacting poly (oxyalkylene ethers) with an excess of polyisocyanates. Illustrative of useful polyoxyalkylene ethers are those which have a molecular weight of from about 100 to about 10,000, preferably from about 500 to about 10,000, more preferably from about 2,000 to about 8,000 which have at least two active hydrogens and which contain at least about 30% by weight based on the total weight of the polyethers of oxyalkylene groups. Useful oxyalkylene groups include oxymethylene, oxypropylene, oxybutylene and the like. Polyethers of this type may be produced by reacting compounds which have reactive hydrogen atoms such as dialcohols, polyalcohols, diphenols, polyphenols, aliphatic diamines, aliphatic polyamines, aromatic diamines, or aromatic polyamines with a suitable alkylene oxide such as ethylene oxide, propylene oxide, butylene oxide, styrene oxide and the like. Suitable polyisocyanates include toluene 4,4'-diisocyanate, toluene 2,4-diisocyanate, toluene 2,6-diisocyanate, diphenylmethane 4,4'-diisocyanate, diphenylmethane 2,4'-diisocyanate, diphenylmethane 2,2'-diisocyanate, toluene 2,6-diisocyanate, hexamethylene 1,6-diisocyanate and useful diamines and polyamines include aliphalic, cycloaliphatic and aromatic di- and polyamines such as ethylene diamine, hexamethylene diamine, diethylene triamine, hydrazine, guanidine, carbonate, N,N'-diisopropylhexamethylene diamine, 1,3-bisaminomethylbenzene, N,N'-bis-(2-aminopropyl)ethylene diamine, N,N'-(2-aminoethyl) ethylene diamine, 4,4'-diaminodiphenyl methane, 4,4'-dimethylamino-3,3'-dimethyldiphenyl methane, 2,4'-diamino-diphenylmethane, 2,4-diaminotoluene, 2,6-diaminotoluene and the like.

In the practice of the preferred embodiments, the hydrophobic polyurethane is formed by reaction of polyisocyanates such as 2,4-tolyene dissocyanate, 2,6-tolylene diisocyanate, 4,4'-diphenylmethane diisocyanate, polyisocyanates from aniline-formaldehyde condensates, 1,6-hexamethylene diisocyanate and 4,4'-discylohexylmethane diisocyanate more preferably aromatic diisocyanates such 2,4-tolylene diisocyanate, 2,6-tolylene diisocyanate and mixtures thereof with a poly(oxyalkylene polyol) or a poly(ester polyol), more preferably a poly(alkylene oxy)polyol such as (poly propylene oxy polyol) poly(ethylene oxy polyol) and mixturers thereof to form a polyurethane having the desired hydrophobicity. Polyurethane foams of the preferred embodiments of this invention can be formed directly from the reaction of di- and/or polyfunctional isocyanate compounds in the polymer along with appropriate catalyst or by a partial reaction of the di- and/or polyfunctional isocyanate compounds with the polyol to form a isocyanate polyurethane prepolymer. Preferably, the isocyanate polyurethane prepolymer possesses 3 to 10% of the isocyanate compounds as free isocyanate groups. Water can be used to catalyze the cross reaction of the remaining groups to form the urethane foam. The adsorption and/or absorption of orgnaic polutants, such as substituted and unsubstituted phenol, onto and into the polyurethane foam can be affected by both the type of polyol used as well as the portion of cross-linked isocyanate compounds present in the foam. In the preferred embodiments of the invention, aromatic isocyanates and/or polyols having a larger ratio of carbon and hydrogen to oxygen such as polyols such as those polyols which contain increased carbon atoms such as poly(propylene ether) glycol and other polyols having pendant aliphatic groups. In the most preferred embodiments, it is preferred to increase the amount of aromatic groups, specifically aromatic isocyanate compounds, in the hydrophobic polyurethane foam in order to enhance the hydrophobic characteristic of the polymer. Preferably, the hydrophobic moieties derived from one or more types of polyurethane contains more than about 15% by weight of an aromatic isocyanate and less than about 85% by weight of a moiety derived from one or more types of a poly(alkylene ether) glycol wherein at least about 40% by weight of the diol derived moieties are derived from such glycols where the alkylene repeat units include more than three carbon atoms especially poly(propylene oxide). Among these preferred embodiments of the invention, more preferred are those embodiments in which the hydrophobic polymer has at least 50% by weight of poly (alkylene ether) glycol and more than about 20% by weight of aromatic isocyanate. In particular preferred embodiments, the polyol content of hydrophobic polyurethane is at least 80% by weight of which less than about 60% by weight is polyethylene ether glycol, and less than about 25% by weight of aromatic isocyanate. In the more particularly preferred embodiments of invention, the polyol content is greater than about 70% by weight polyethylene oxide and less than about 30% by weight of aromatic isocyanate.

The amount of substrate 18 included in the biologically active particles 16 may vary widely. In general, the amount of substrate 18 is from about 50 to about 95 weight percent based on that total weight of biologically article particle 16. In the preferred embodiments of the invention, the amount of substrate 18 is from about 60 to about 90 weight percent based on the total weight of particle 16, and in the particularly preferred embodiments is from about 70 to about 85 weight percent on the aforementioned basis.

The most preferred polymeric substrate material in the present invention is a flexible open-celled foams with a high permeability to water. The foam used in the practice of this invention must accommodate feed flow in the fixed bed configuration. To this end, it is important that the foam has a highly interconnected porosity where the foam voids desirably are at least about 2 millimeters and can range up to about 10 millimeters or more in size.

The voids preferably are on the order of from about 5 to about 6 millimeters in size. The foam is desirably semiflexible with a density of under about 2 pounds per cubic foot. However, higher densities of from about 4 to about 7 pounds per cubic foot or even higher are usable. Foam density is related to the economics of the invention and not performance and the invention may be practiced with a large range of foam density. The chemical nature of the foam, aside from its hydrophobicity, is a relatively unimportant aspect of the invention so long as the foam is open-celled with void characteristics as described above and is suitable for use in a fixed bed reactor over extended periods of time and can be impregnated with appropriate microorganisms without being lethal. Flexible and semi-flexible polyether based polyurethane foams having an open-cell structure are preferred for the practice of this invention. Although flexible and semi-flexible open-celled polyurethane foams are preferred substrates it is understood that the present invention includes rigid polyurethane and other foams having an open-celled structure which can also be impregnated with particulate absorbents.

Following impregnation of the porous polyurethane support with activated carbon, the biomass support substrate so produced is then cut into an appropriate particle size and loaded as a fixed bed into a reactor. A suspension of pollutant degrading microbes is then added to the reactor. The biodegradative microbes absorb and attach on, in or on and in the activated $$ACE = \frac{GPR/GW}{GPR/GA}$$

where:

"ACE" is the absorption coefficient, "GPR" is the grams of phenol remaining in the solution, "GW" is grams of water in the solution and "GA" is grams of polyurethane.

The adsorption co-efficients or α constant of the umimpregnated and activated carbon impregnated polyurethanes are set forth in the following Table I:

TABLE I

| EXP. NO. | FOAM TYPE | α VALUE |
|---|---|---|
| 1 | Hydrophilic Foam | 9.0 |
| 2 | Hydrophilic Foam with 20% by wgt carbon | 74.8 |
| 3 | Hydrophobic Foam (General Foam) | 62.6 |
| 4 | Hydrophobic Foam with 20% by wgt. carbon | 84.4 |

The Langmuir adsorption curves for the polyurethane foams without carbon were determined to by ploting C/Q versus C to determine N and $K_d$ values for the Langmuir adsorption. The results are set forth in the following Table II.

TABLE II

| Hydrophilic Polyurethane | | Hydrophobic Polyurethane | |
|---|---|---|---|
| C | Q | C | Q |
| 55 | 0.0006 | 62 | 0.0040 |
| 103 | 0.0015 | 121 | 0.0080 |
| 288 | 0.0029 | 291 | 0.0210 |
| 548 | 0.0058 | 615 | 0.0390 |
| 2192 | 0.0254 | 1426 | 0.0570 |
| 3174 | 0.0411 | 2770 | 0.1230 |
| 3884 | 0.0488 | 3984 | 0.2020 |

As shwon in Table II, the hydrophobic polyurethane had higher Q value or amounts of adsorbed phenol.

EXAMPLE 2

The following example shows the unexpected high performance of hydrophobic polyurethane foam with regard to hydrophilic polyurethane foam loaded with carbon and hydrophobic polyurethane foam loaded with carbon, shock loading of bioreactors with phenol. The supports were evaluated in glass columns of dimensions 64 cm height×3.4 cm diameter. The columns were packed with foam blocks of approximately 1 cm³ in size. Phenol containing water was pumped into the bottom of the column and exited from the top. Air was sparged from the bottom of the column using a ceramic sparging stone and exited the reactor from the top. The flow rate of aqueous stream through the reactors was such that the hydraulic residence time was 12 hours. Phenol levels in the effluent from the reactors was determined by colorimetric assay. The results are shown in the following Table III.

TABLE III

| | Phenol Concentration (ppm) | | | |
|---|---|---|---|---|
| Time days | Inlet Wastewater | Hydrophobic Polyurethane | Hydrophobic Polyurethane with Carbon | Hydrophilic Polyurethane with Carbon |
| 1 | 105 | 0.005 | 0.003 | 0.013 |
| 4 | 130 | 0.003 | 0.002 | 0.004 |
| 5 | 1100 | 228 | 278 | 113 |
| 6 | 1330 | 4 | 18 | 0.021 |
| 7 | 1210 | 0.009 | 0.008 | 0.005 |
| 8 | 1300 | 0.008 | 0.008 | 0.005 |
| 14 | 1160 | 0.121 | 19 | 0.189 |

The results from this study (FIG. 8) showed that the hydrophobic foam supports without impregnated carbon enabled the bioreactor to respond to shock loading of the reactor with relatively large amounts of phenol.

EXAMPLE 3

Using the procedure of Example 1, the phenol adsorption capacity of certain hydrophobic polyurethanes were compared to that of hydrophilic polyurethane. The hydrophilic polyurethane foam selected for evaluation was that used in Example 1 and identified as Foam A. The hyrophobic polyurethane selected for evaluation was that used in Example 1 and identified as Foam B, and Foam $F_x$ SIF II (a polyol content of 75% by weight (approximatley 40% by weight ethylene oxide and 60% by weight propylene oxide) and a toluene disocyanate content of approximately 25 to 35% by weight of reactants from Foamex Inc.

The results are set forth in the following Table IV:

TABLE IV

| Foam | Description | α-value |
|---|---|---|
| A | hydrophilic | 9 |
| B | hydrophobic | 28 |
| C | hydrophobic | 44 |

Figure 9:
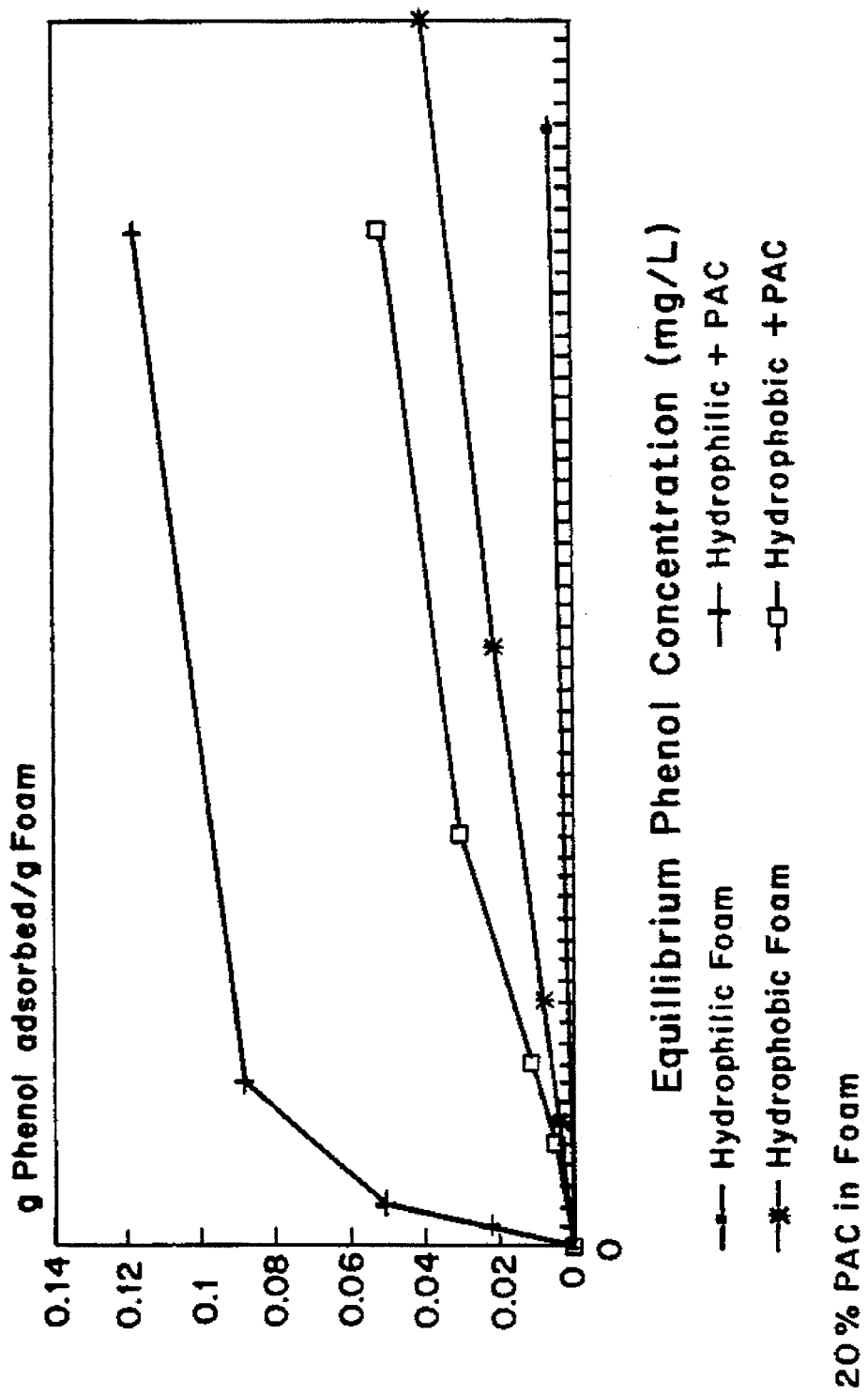
FIG. 9 is an adsorption curve measuring phenol adsorbed for hydrophilic and hydropholic foams and the foams impregnated with carbon.
Figure 10:
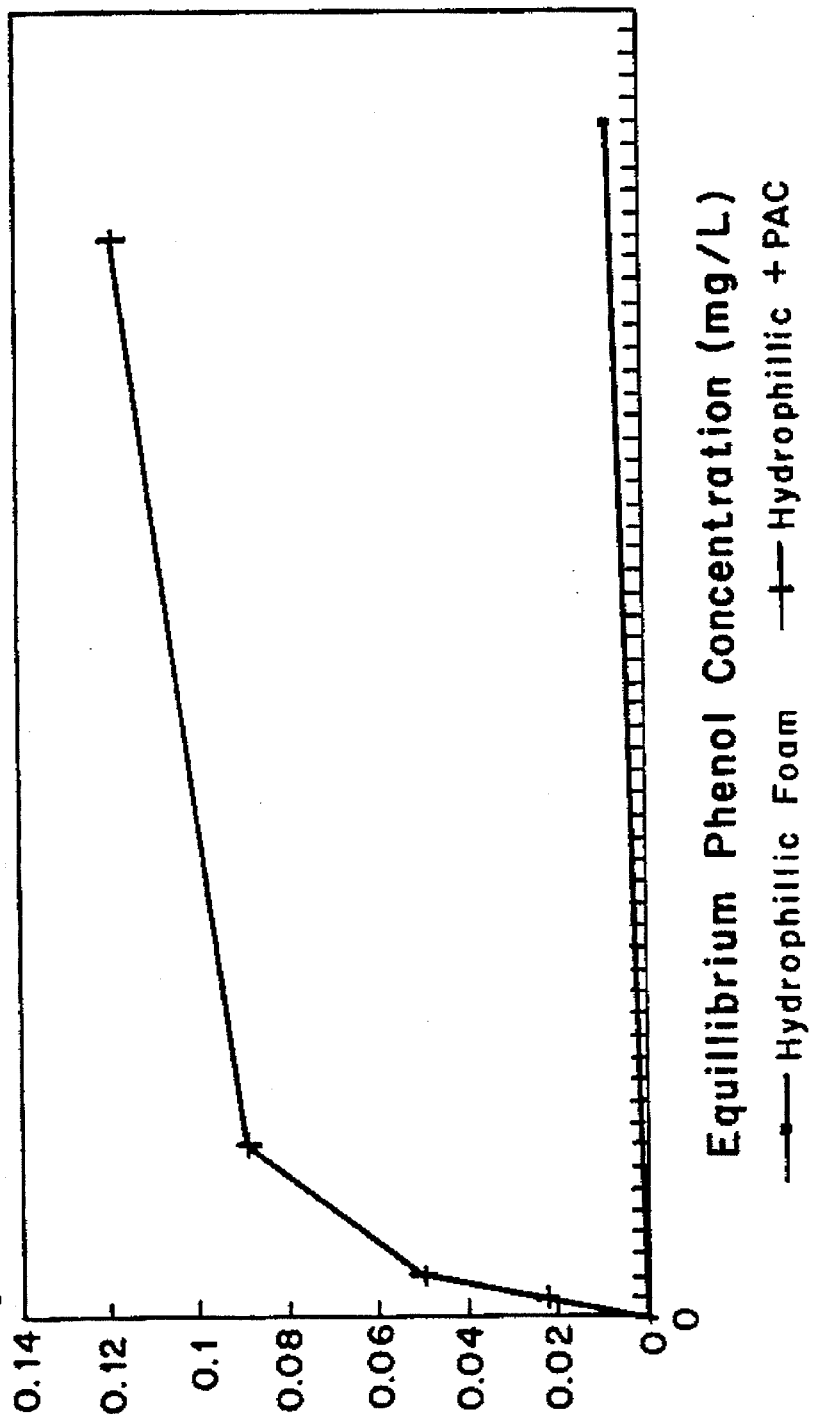
FIG. 10 is an adsorption curve measuring phenol adsorbed for a hydrophilic foam and a carbon impreganted hydrophilic foam.
Figure 11:
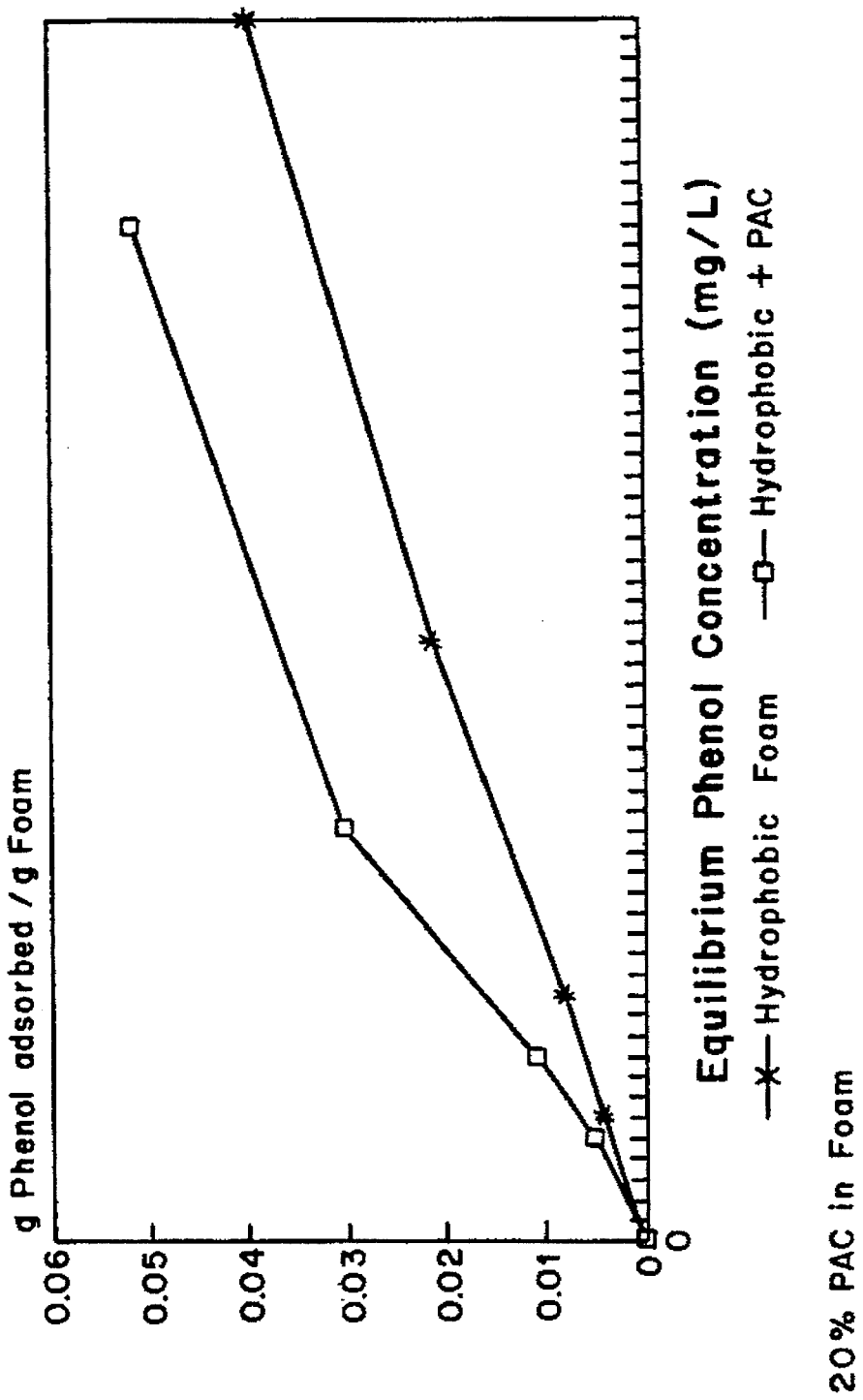
FIG. 11 is an adsorption curve for hydrophobic foam and carbon impregnated hydrophobic foam.

The chemical nature of the hydrophobic foams are different from that of the hydrophilic foam as shown in FIGS. 9, 10 and 11. The polyol used in the hydrophilic foam is essentially all polyethylene oxide and has no alkyl chains. The polyol used in the hydrophobic polyurethane has significant amounts of polypropylene oxide which has a significant amount of alkyl claims. This is one aspect that promotes the hydrophobicity of the foam. The other aspect which promotes hydrophobicity is the greater concentration of rigid aromatic segments used in the hydrophobic foam (polyisocyanate aromatics).

EXAMPLE 4

Phenol Adsorption/Absorption by Synthetic Polymers

A series of experiments were carried out to compare the adsorptive characteristic of hydrophobic polyurethane foam and hydrophilic polyurethane foam to that of other hydrophobic polymers. The hydrophobic polyurethane foams selected for evaluation were Foams B and C of Example 3 the other polymers selected for evaluations were polypropylene, polyuethylene and nylon 6. In these experiments, one gram quantities of polymer fiber (1–2 mm diameter) or polyurethane foam were added to flasks containing 100 ml of an aqueous solution of 100 ppm concentration of phenol. The flasks were left to equilibrate for 24 hours after which the α constant for phenol adsorption was determined using the procedure of Example 1. The results are set forth in the following Table V.

TABLE V

| Experiment No. | Polymer | α Value |
| --- | --- | --- |
| 1 | Polpropylene | <1 |
| 2 | High Density Polyethylene | <1 |
| 3 | Nylon 6 | 3 |
| 4 | Hydrophilic Polyurethane Foam A | 9 |
| 5 | Hydrophobic Polyurethane Foam C | 44 |
| 6 | Hydrophobic Polyurethane Foam B | 38 |

The hydrophobic polyurethane foams have a greater capacity to remove phenol from solution than either the hydrophilic polyurethane or the other hydrophobic polymers such as polyethylene or polypropylene. Thus this characteristic appears to be characteristic of the hydrophobic polyurethanes only and is not a general feature of hydrophobic polymers.

EXAMPLE 5

A series of experiments were carried out to evaluate the effect of carbon impregnation on the adsorptive capacity of a hydrophobic polyurethane, a hydrophilic polyurethane and high density poly ethylene, a hydrophobic polymer. The hydrophobic polyurethane foam selected for evaluation as Foam B of Example 3 and the hydrophilic polyurethane foam selected for evaluation was Faom a of example $3_6$. In these experiments, the polymers or prepolymers were embedded with 10% powdered activiated carbon (PAC) prior to either extrusion or foaming. The constants for the carbon impregnated polymer was determined along with the polymer without carbon using the proceudre of Example 1. The results are set forth in the following Table VI.

TABLE VI

| Experiment No. | Polymer | α Value |
| --- | --- | --- |
| 1 | High Density Polyethylene (HDPE) (HDPE) | <1 |
| 2 | HDPE/Carbon | <1 |
| 3 | Foam A | 10 |
| 4 | Foam A/Carbon | 75 |
| 5 | Foam B | 40 |
| 6 | Foam B/Carbon | 45 |

The hydrophobic polyurethane foam is enhanced slightly by impregnation with activated carbon, but the hydrophilic polyurethanes shows significantly better phenol removal when impregnated with activated carbon. The hydrophobic polyethylene, however, shows no significant ability to adsorb phenol whether it is impregnated with activated carbon or not.

Thus the ability of the hydrophoblic polyurethanes to adsorb phenol is an unexpected characteristic of this class of polymers.

What we claim is:

1. A process for purification of organic pollutants from waste water which comprises: passing an aqueous influent stream containing one or more organic materials through a reactor in the presence of a gas comprising an effective amount of oxygen, said reactor containing a biologically active biomass comprising a plurality of biologically active particles consisting essentially of a hydrophobic polyurethane substrate in particulate form and an effective amount of one or more aerobic microorganisms capable of metabolizing at least one of said organic materials in said influent stream to provide an effluent stream in which the concentration of at least one of said materials is less than the concentration of said material in said influent stream, wherein said microorganisms are on, in or on and in said substrate.

2. The process of claim 1 wherein said hydrophobic polyurethane substrate has a molar ratio of carbon and hydrogen atoms to oxygen and nitrogen atoms equal to or greater than about 1.4.

3. The process of claim 2 wherein said ratio is equal to or greater than about 2.0.

4. The process of claim 3 wherein said ratio is equal to or greater than about 2.5.

5. The process of claim 4 wherein said ratio is equal to or greater than about 3.0.

6. The process of claim 4 wherein said hydrophobic polyurethane exhibits a Kd value of at least about 0.001 mg/L.

7. The process of claim 6 wherein said Kd value is from about 0.01 to about 300 mg/L.

8. The process of claim 6 wherein said polyurethane is derived from polymerization a polyesocyanate and a poly (alkylene ether) glycol.

9. The process of claim 8 wherein said polyisocyanate is an aromatic diisocyanate.

10. The process of claim 9 wherein said poly(alkylene ether) glycol is poly(ethylene ether) glycol, poly(propylene ether) glyco, poly(propylene ether -co- ethylene ether) glycol or a mixture thereof.

11. The process of claim 10 wherein the aromatic dissocyanate is a toluene diisocyanate and, diphenyl methane diisocyanate.

12. The process of claim 11 wherein said diisocyanate is a toluene diisocyanate.

13. The process of claim 12 wherein said toluene diisocyanate is toluene 2,4-diisocyanate, toluene 2,6-diisocyanate or mixtures thereof.

14. The process of claim 13 wherein said poly(alkylene ether) glycol is a mixture of poly(ethylene ether) glycol and poly(propylene ether) glycol, poly(ethylene ether -co+propylene ether) glycol.

15. The process of claim 14 wherein the amount of aromatic diisocyanate is greater than about 15% by weight based on the total weight of the polyurethane, and the amount of poly(alkylene ether) is less than 80% by weight of the polyurethane wherein at least about 40% by weight of said poly(alkylene ether) glycol is derived from propylene oxide.

16. The process of claim 15 wherein the aromatic diisocyanate contained in said polyurethane is at least about 20% by weight of the polyurethane.

17. The process of claim 16 wherein the polyol contained in said polyurethane is t least about 5% by weight of said polyurethane.

18. The process of claim 17 wherein at least about 50% of said poly(alkylene ether) glycol is derived from propylene oxide.

19. The process of claim 18 wherein the aromatic diisocyanate contained in said polyurethane is at least about 35% by weight of the polyurethane.

20. The process of claim 19 wherein at least about 55% of said poly (alkylene ether) glycol is derived from propylene oxide.

21. The process of claim 19 wherein said at least one of said materials is a phenolic material.

22. The process of claim 21 wherein at least one of said material is a phenolic material.

23. The process of claim 22 wherein said influent stream comprises phenol.

* * * * *